United States Patent [19]
Phelps

[11] Patent Number: 5,023,022
[45] Date of Patent: Jun. 11, 1991

[54] COOLING TOWER WITH MULTIPLE FILL SECTIONS OF DIFFERENT TYPES

[76] Inventor: Peter M. Phelps, 15 Buckeye Way, Kentifield, Calif. 94904

[21] Appl. No.: 451,464

[22] Filed: Dec. 15, 1989

Related U.S. Application Data

[63] Continuation-in-part of Ser. No. 410,364, Sep. 20, 1989, Pat. No. 4,934,663.

[51] Int. Cl.$^5$ .............................................. B01F 3/04
[52] U.S. Cl. .................... 261/111; 261/112.2
[58] Field of Search ..................... 261/112.2, DIG. 11, 261/110, 111

[56] References Cited

U.S. PATENT DOCUMENTS

| | | | |
|---|---|---|---|
| 3,115,534 | 12/1963 | Bottner | 261/DIG. 11 |
| 3,322,409 | 5/1967 | Reed | 261/DIG. 11 |
| 3,415,502 | 12/1968 | Munters | 261/112.2 |
| 3,707,277 | 12/1972 | Phelps | 261/DIG. 11 |
| 3,733,063 | 5/1973 | Loetel et al. | 261/112.2 |
| 3,794,304 | 2/1974 | Cates et al. | 261/DIG. 11 |
| 3,917,764 | 11/1975 | Phelps | 261/DIG. 11 |
| 4,129,625 | 12/1978 | Fordyce et al. | 261/DIG. 11 |
| 4,317,785 | 3/1982 | Dickey, Jr. et al. | 261/DIG. 11 |
| 4,385,011 | 5/1983 | Skold | 261/112.2 |
| 4,460,521 | 7/1984 | Stackhouse | 261/DIG. 11 |

FOREIGN PATENT DOCUMENTS

| | | | |
|---|---|---|---|
| 759046 | 4/1971 | France | 261/DIG. 11 |
| 2901156 | 7/1980 | France | 261/DIG. 11 |

*Primary Examiner*—Tim Miles
*Attorney, Agent, or Firm*—Flehr, Hohbach, Test, Albritton & Herbert

[57] ABSTRACT

A cooling tower having inboard and outboard liquid film fill sections, and inboard and outboard liquid supply sections, the outboard liquid supply section supplying liquid at a higher rate, and the fill density of the outboard film section being substantially higher.

17 Claims, 1 Drawing Sheet

COOLING TOWER WITH MULTIPLE FILL SECTIONS OF DIFFERENT TYPES

CROSS-REFERENCE TO RELATED APPLICATIONS

This application is a Continuation-in-Part of my co-pending application entitled COOLING TOWER WITH SLOPING HIGH DENSITY FILM FILL SANDWICHED BETWEEN LOW DENSITY FILM FILL, Ser. No. 410,364, filed Sept. 20, 1989, now U.S. Pat. No. 4,934,663.

BACKGROUND OF THE INVENTION

Conventional cooling towers of the counterflow type employ a generally horizontal fill with an air opening below the lower surface of the same. Counterflow fills of the film type have a relatively good heat transfer coefficient. The air is drawn from below the fill and out the tower by a fan, or the draft from a high stack, positioned above the fill. When the distance between the fill and base of the tower is relatively small, the air must be drawn from the surrounding into the tower at a relatively high velocity and, when it reaches a position below the fill, it is forced to turn abruptly at a sharp angle to proceed upwardly through the fill. This requires high fan power requirements. On the other hand, by building the tower of relatively high supporting columns, the velocity of the incoming air is somewhat reduced but the overall height of the tower is substantially increased. Among the disadvantages of such height increases are increased pumping head, structural wind loads, and general appearance.

Conventional crossflow towers comprise a relatively thin vertical fill section with the water being fed from an overhead sourc and the air being drawn therethrough from air inlets at the side of the tower. Since there is no necessity for the air to make radical changes of direction in the fill and the air inlet is spaced along the entire height of the fill, the overall air pressure losses are usually less than those of a conventional counterflow tower as set forth above.

A crossflow cooling tower is inherently less efficient with respect to heat transfer than a counterflow tower based on a unit of fill. Another disadvantage of the crossflow cooling tower is that the water is loaded onto the top of the relatively thin crossflow fill section. There is a maximum water load beyond which the water will not redistribute effectively because it will start gushing in a steady stream through the tower. When this maximum water load is exceeded in a crossflow tower of the film fill type, the water will not cling to the fill, leading to relatively poor heat transfer between the air and water. Also, resistance to the transversely flowing air is substantially increased requiring excessive fan power. This problem of water loading cannot be effectively overcome by widening the fill in the direction of air flow because there is a limiting factor on cooling efficiency relative to the thickness of the fill. A major factor in this limit is that the fan power for the longer air path through the fill disporportionately increases in comparison to the advantages to be attained by easing the above water load problems.

Corrugated film type fill is relatively efficient in either a counterflow or crossflow cooling tower. When utilized in conventional (horizontal) counterflow type tower, variations in the direction of the corrugations will affect the ease or difficulty of gas and liquid passage in a similar manner. For example, by disposing the corrugations at a relatively vertical inclination, the gas path is eased for lower power requirements but so is the liquid path leading to relatively poor film formation and low liquid residence time. On the other hand, by disposing the corrugations at a relatively horizontal inclination, the gas must travel through a tortuous path which greatly increases the fan power requirements.

U.S. Pat. No. 3,917,764 discloses a liquid-gas cooling tower which combines advantages of the counterflow and crossflow cooling towers. Specifically, that patent describes a cooling tower with a film fill section having an incline principal plane formed of a number of sheets mounted for the passage of gas and liquid. This sloping film fill section spreads the liquid gravitating onto its upper surface into a thinner, more uniform film on the lower surface. Splash-type fill is disposed inboard and/or outboard of the sloping fill. Corrugated and other types of film fill are disclosed. FIG. 3 discloses multiple spaced, stacked sloping film fill sections, each extending only part of the total vertical distance across the gas inlet but across the total liquid supply area. FIG. 4 discloses multiple side-by-side sloping film fill sections extending across the entire gas path but only partially across the liquid supply path.

U.S. Pat. No. 3,450,393 discloses a crossflow cooling tower including a stack of two film fill sections with a thin high density fill disposed over a low density film fill section which performs the cooling. The upper fill section is used to provide an even diffusion of water falling from the distribution pan. The corrugated sheets are perpendicular to the direction of air flow through the lower section and so block the passage of air. At column 2, lines 63-69, the patent specifies that the air does not pass through the channels of this high density film.

U.S. Pat. No. 4,460,521 discloses another use of fills of different density, in this instance, all of the splash fill type in a crossflow cooling tower. In one embodiment, a sloped section of high density splash fill is flanked by triangular sections of low density splash fill. In another embodiment, outboard high density splas fill is mounted adjacent to inboard low density splash fill.

Another combined fill application is disclosed in U.S. Pat. No. 4,317,785. That patent describes a cooling tower with a number of film fill box-like sections arranged in a stair-step configuration progressing with the highest section at the outboard end of the fill area and the lowest section at the inboard end. The remainder of the tower available for water distribution is filled with splash fill. Air travels horizontally through the film fill boxes.

U.S. Pat. No. 4,592,877 discloses a combination of crossflow and counterflow. FIG. 3 of that patent discloses two sloping film fill sections of the type described in U.S. Pat. No. 3,917,764 flanking a horizontal film fill section, all disposed above splash fill sloping generally inboard to define a partially open chamber.

U.S. Pat. No. 3,322,409 discloses the advantage of high water loading for ice reduction on air inlet faces of a cooling tower.

In my co-pending application, Ser. No. 410,364, a cooling tower is disclosed with high density sloping film fill flanked by low density upper and lower film fill. In a specific embodiment, the sheets form integral units with upper and lower film fill sections of generally triangular configuration and the film fill formed of adjacent crossing corrugated sheets.

SUMMARY OF THE INVENTION AND OBJECTS

It is a general object of the invention to provide a liquid-gas contact tower which uses multiple cooling sections having different types of fill which maximize the cooling effects at the outboard portion of the tower.

It is a specific object of the invention to provide such a tower using optimum high water loading in the outboard section of the tower and low water loading on the inboard section.

It is another specific object of the invention to provide a tower with multiple stacked, sloping film fill sections of variable lengths to maximize efficiency.

Other objects and features of the invention will be apparent from the following description taken in conjunction with the appended drawings.

In accordance with the above objects, in one embodiment, the present invention relates to a cooling tower with liquid supply means formed of an outboard liquid supply section which supplies liquid at a flow rate per distribution area substantially higher than an inboard liquid supply section. At least one outboard film fill section is disposed directly below the outboard liquid supply section while a different inboard fill section of the film fill or splash fill type is disposed directly below the inboard liquid supply section. A preferred outboard film fill section is formed of vertically adjacent crossing corrugated sheets with a sloping principal plane. One of these sloping film fill sections extends only below the outboard liquid supply section. It may be combined with other similar sloping film fill sections. Such sections may also be combined with a lower sloping film fill section extending across the entire gravitating liquid path.

DETAILED DESCRIPTION OF THE PREFERRED EMBODIMENTS

Figures 1, 2, 3, 4:
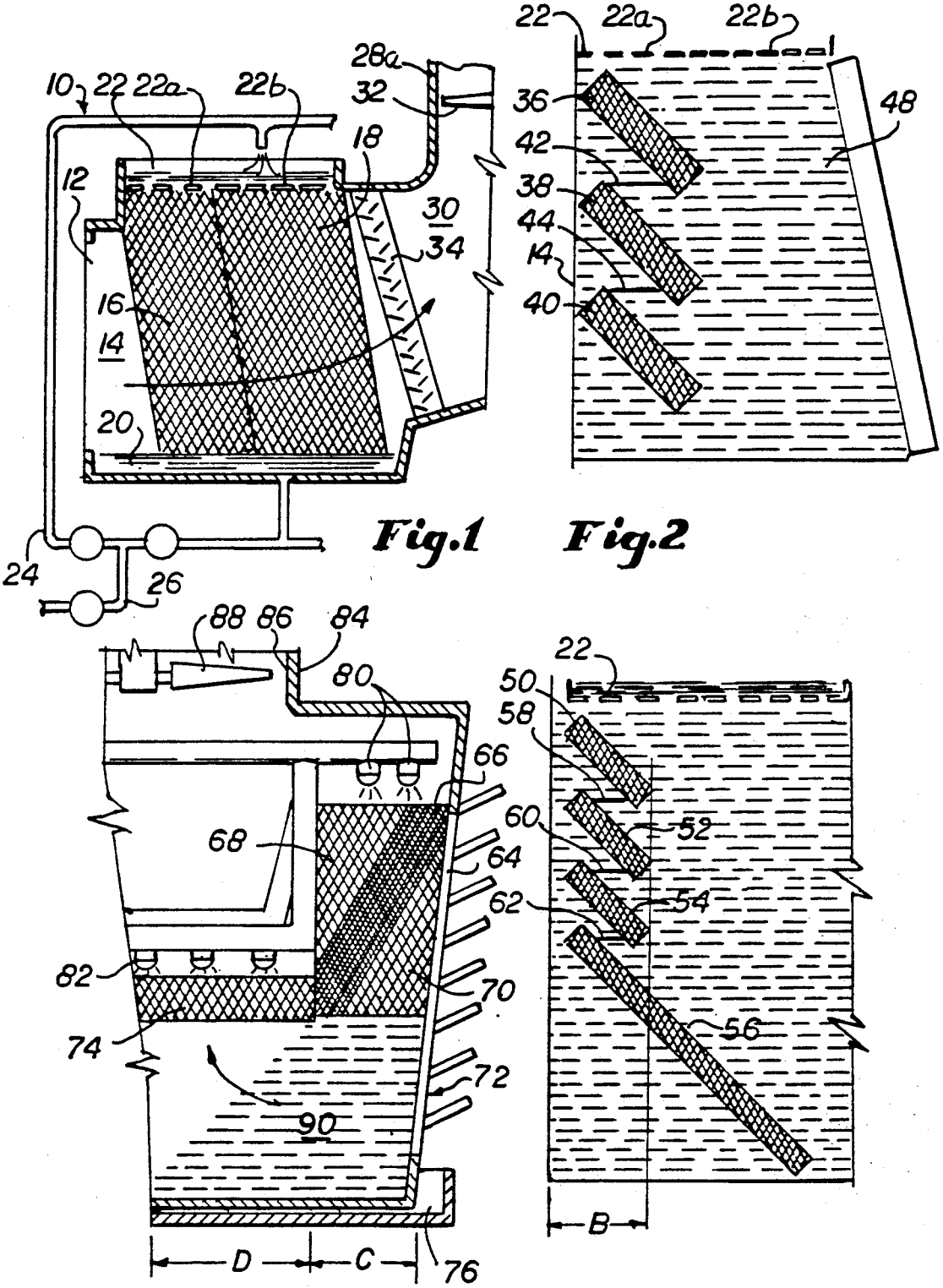
FIG. 1 is one embodiment of the present invention illustrating uneven water loading for a generally upright sheet film fill section.
FIGS. 2 and 3 are other embodiments of the invention with multiple stacked sloping film fill sections.
FIG. 4 is another embodiment of the invention including an outboard film fill section and an inboard horizontal counterflow section.

In general, the present invention concerns the utilization of multiple different outboard and inboard fill sections, preferably with high water loading on the outboard side of the tower. As used herein, the term "outboard" means closer to the gas inlet opening, and the term "inboard" means farther from the gas inlet opening and closer to the gas outlet opening. The outboard fill section includes at least some film fill and may be totally film fill. Alternatively, it may include some voids or splash fill. The inboard fill section includes some splash fill or film fill, or both.

Although useful in gas contacting towers and the like, such towers will be designated "cooling towers" herein, as most commonly utilized for cooling liquid, such as water, by inducing the surrounding gas, air, into the tower to contact and thereby cool the water.

Referring to FIG. 1, a cooling tower, broadly denoted by the number 10, is illustrated comprising two similar cooling sections, disposed on opposite sides of a central plenum chamber. For simplicity of description, only the section illustrated on the left-hand portion of the drawing will be described. This section includes an upright side wall 12 having a gas inlet opening 14 extending along a major portion of the side wall and defined by a framing portion of the same.

An outboard fill section 16 is mounted adjacent to gas inlet opening 14 and extends the full vertical distance of gas inlet opening 14. To the right or inboard of outboard fill section 16 is mounted inboard fill section 18 also extending the full vertical distance of gas inlet opening 14. As illustrated, both fill sections are mounted at approximately a 10° angle off the vertical extending with the outermost upper corner outboard of the outermost lower corner. This is conventional sloping to accommodate water drift conditions. However, if desired, these sections may be vertically disposed.

A cool liquid basin 20 is disposed below fill sections 16 and 18 to receive liquid gravitating therefrom.

Means is provided for supplying gravitating liquid to an upper portion of the tower. As illustrated, such means comprises an open top perforated distribution pan or tray 22 includes an outboard liquid supply section 22a and an inboard liquid supply section 22b. Outboard section 22a supplies gravitating liquid at a flow rate per distribution area onto outboard fill section 16 substantially higher than inboard fill section 22b onto inboard fill section 18. As illustrated, this is accomplished by the use of an open tray 22 with a larger nozzle or port area in section 22a than in 22b. Such large nozzle or port area may include larger sized nozzles or a larger number of nozzles so long as the higher flow rate is accomplished. Another way to accomplish the same objective, not shown, is to partition the outboard liquid supply section 22a from the inboard liquid supply section 22b and to provide a higher flow of water to the outboard section. Another embodiment would be to use spray nozzles rather than a distribution pan with a higher volume of spray on the outboard section compared to the inboard. section. This could be accomplished by using higher pressure at the outboard section or a large number of spray nozzles. At least 5% to 10% more water at the outboard section compared to the inboard section accomplishes increased efficiencies. However, it is preferable that the water load on the outboard section be at least 50% to 100% more than the water loading on the inboard section to accomplish the beneficial effects as described hereinafter.

The dividing line between the outboard liquid supply section 22a and the inboard liquid supply section 22b may vary depending upon the characteristics of the underlying fill. For most applications, the outboard liquid supply section 22a extends from 20% to 50% and preferably about 30% to 40% of the total area across the liquid supply means, pan 22 as illustrated.

Preferably, the effective fill density of the outboard section is substantially higher than that of the inboard section. In one embodiment, both sections are of the film fill type including vertically disposed sheets parallel to the direction of gas flow. More particularly, a preferred type of fill is described in application Ser. No. 410,364 crossing corrugated sheets with ridges and grooves disposed so that ridges of alternate sheets cross and abut against the ridges disposed between alternate sheets to form channels between them. As described in such application, the channels have a constantly varying width from 0 at the contact points between the sheets to a maximum of twice the distance between the ridges and grooves of individual sheets. The sheets are vertically disposed to provide an essentially vertical path to liquid gravitating from tray 22. The sheets also define a path A between the gas inlet and outlet openings.

An embodiment of FIG. 1 where fill sections 16 and 18 are both comprised of adjacent parallel vertical sheets as described above, effective fill density refers to the number of sheets per unit length of fill thickness. Here, the high density fill preferably includes about 1.25 to 3 times the number of sheets per unit length compared to the low effective density fill and preferably from 1.5 to 2 times for optimum performance. For example, Munters 25060 could be used as low density fill and Munters 12060 as high density fill. Suitable dense film fill in the outboard section includes an average distance between adjacent sheets no greater than about 25 mm.

Conventional splash fill, not shown, can be used in place of the inboard film fill section 18 described above. Conventional splash fill includes generally horizontal slats disposed on stringer wires spaced apart from each other at the same elevation and above and below them. Such splash fill provides splash surfaces for gravitating water from tray 22 to thereby disperse the water for more efficient cooling contact with the incoming air. In this instance, effective fill density of the inboard fill section refers to cooling efficiency comparable to that of film fill section 18. For a combination of inboard film and splash fill the effective fill density is defined solely by the film fill.

A cooling region is defined as the area below the full horizontal extent from the outboard to the inboard side of the tower directly below the liquid supply means 22 and extending substantially the full vertical distance of the gas inlet opening 14. As illustrated in FIG. 1, this cooling region is in the form of a parallelogram.

In composite, the outboard fill section 16 and inboard fill section 18 extend substantially the entire outboard to inboard distance of the cooling region. In certain applications, some area of the outboard or inboard fill sections may be devoid of fill. However, at least some fill is present in both the outboard and inboard sections of the cooling regions.

For maximum efficiency, outboard fill section 22a should extend at least about 20% to 30% across the cooling region but no greater than about 50% to 60%. For maximum efficiency, it extends about 30% to 40% across. Correspondingly, the remainder of the horizontal area of the cooling region is comprised of the inboard section and the thin layer adjacent to the air inlet, if the thin layer is utilized. The inboard extent of outboard fill section 16 should be approximately the same as the inboard extent of outboard liquid supply section 22a.

Referring again to FIG. 1, suitable pumping structure, not shown, is operably coupled to basin 20 for moving liquid through line 24 for delivery of the water to equipment for cooling and returning the same to tray 22 through valve combination 26. If desired, a portion of the liquid removed in line 24 may be recycled to tray 22 for further cooling prior to delivery to equipment, or liquid from the equipment can bypass tray 22 directly into basin 26.

Referring again to FIG. 1, the vertical stack 28 is secured to the top face of tower 10 and extends upwardly from a central plenum chamber 30 to define an upper outlet opening 28a for gas (air) exiting therefrom. A fan 32 within stack 28, coupled to a suitable source of power for actuation, causes currents of air to be drawn through fill sections 16 and 18 generally along path A and forced upwardly through chamber 30 into stack 28 for discharge through the upper portion of the latter. Alternatively, the cooling tower may be operated by natural induction by the elimination of fan 32 in which case air would be induced to flow through the tower by means of natural convection of the warm exhaust air rising through chamber 30 and stack 28.

A drift eliminator wall 34 is disposed across the path of air exiting from sections 16 and 18 in a generally upright position to prevent gravitating water from being carried as a spray into the plenum chamber. Wall 34 may be of any conventional type such as including a series of spaced inclined baffles to prevent significant quantities of liquid droplets from escaping into the plenum chamber.

Referring to FIG. 2, another embodiment utilizing uneven water loading is illustrated with a different fill configuration. Here, a series of three sloping stacked fill sections 36, 38 and 40 are illustrated of the type described in U.S. Pat. No. 3,917,764. They extend from upper outboard ends toward lower inboard ends. Preferably they include vertically disposed sheets of the corrugated type as described above which are parallel to the direction of airflow through the gas inlet openings. As such fill sections may be installed in the same general type of tower as illustrated in FIG. 1, only the cooling region of the tower is shown. The inclination of the film fill assemblies 36, 38 and 40 are illustrated 45° to the vertical. However, it should be understood that this angle may be varied substantially between 20° and 70° to the vertical depending upon the requirements of a particular tower. It is important that the major portion, and, preferably, essentially all of the air entering inlet opening 14 be prevented from bypassing film fill sections 36, 38 or 40. If a major opening around the film fill assemblies were provided, the air would take this path. To prevent this, perforated membrane means comprising perforate pans or grids 42 and 44 are provided having openings large enough to permit liquid gravitating from assembly 40 and 38 to pass through and contact the upper surface of the next lower film fill section. On the other hand, pans 42 and 44 provide barriers to gas flow. To accomplish this, pans 42 and 44 preferably extend from the lower edge of a film fill section to the upper edge of the one directly below the same. If desired, conventional splash fill 46 may be provided in the spaces between the film fill section in the form of horizontal splash plates or decks. Such splash type fill provides increased gas liquid contact efficiency with respect to that portion of the tower. In this instance, the effective fill density is defined herein solely by the film fill.

In this embodiment, the outboard film fill sections 36, 38 and 40 preferably extend the same distance inboard as does outboard liquid supply section 22a. Like the embodiment of FIG. 1, the inboard fill section may be of any conventional fill type having a lower density than the fill sections in the outboard portion of the tower in a ratio described with respect to the embodiment of FIG. 1. As illustrated, the inboard fill section comprises splash fill 48.

The embodiment of FIG. 2 is illustrated with three tiers of sloping film fill section. However, it should be understood that one, two or four or more such tiers may be employed.

The embodiments of FIGS. 1 and 2 share the features of higher outboard than inboard water loading and higher effective fill density outboard than inboard. It has been found that increasing the water load on the outboard film fill increases the efficiency of the tower. This is believed due to the beneficial effect of high water loading at the outboard side of the tower where it contacts the most efficient type of fill and the coolest air. Another advantage of using higher water loading in the outboard portion of the tower is that it tends to more nearly flood that portion of the tower. This creates a condition where icing of outer tower cooling surfaces in cold winter weather is reduced. Also, such high water loading correspondingly reduces water loading in the inboard portion of the tower adjacent to the drift eliminators. This reduced water loading results in reduced carry-over of objectionable drift into and through the drift eliminators.

Referring to FIG. 3, three superposed, spaced, sloping film fill sections 50, 52 and 54 are illustrated of the same general type as shown in FIG. 2. In addition, a fourth lower spaced sloping film fill section 56 is illustrated. All film fill sections 50, 52, 54 and 56 have principal planes inclined at angles from 20° to 70° to the vertical and preferably parallel to each other in spaced superposed relationship. Sections 50, 52 and 54 extend only partway inboard of the tower to a maximum extent of about 50% (about 30% as illustrated) of the length of the liquid cooling region generally designated by the dimension B. Preferably such sections only extend about 30% to 40% of the distance. The same fill sections each also extend less than 50% (about 20% as illustrated) of the vertical gas intake distance of gas inlet opening 14. In contrast, sloping film fill section 56 extends essentially from the outboard side of the tower a distance of at least about 90% of the liquid cooling region and preferably approximately the total distance. Perforated pans 58, 60 and 62 extend between the superposed sloping film fill sections and accomplish the same purpose as perforated pans 42 and 44 described with respect to the embodiment of FIG. 2.

Low density fill is preferably disposed in the cooling region between distribution pan 22 and the top surface of sloping film fill 56. Such fill is of relatively low density compared to that of sloping film fill sections 50, 52, 54 and 56 as described above. A thin layer of this fill can be installed adjacent to air inlet wall as described above.

One advantage of the configuration of FIG. 3 is that the tower tends to act as a counterflow tower. Very cold air is contacted on the outer surface where the air enters. This maintains the air entering the portion of the tower below section 56 from being excessively heated. The water entering the inboard region of the lower film fill is slightly warmer since it does not contact a high density film fill layer for cooling it. However, there is better heat transfer in the air flowing across the lowest part of the tower since it contacts this warmer water. Therefore, there is a greater driving force between this water and the lower air. The net effect is that the cooled water temperature leaving the tower is only slightly affected but the amount of film fill required is reduced since a major portion of the film fill in sections 50, 52 and 54 is eliminated. Also, the installation of the film fill, particularly in the retro-fitting of an existing tower, is easier since there is ready access to the upper film sections through the open air inlets.

The embodiment of FIG. 3 is most effective in combination with uneven water loading wherein the flow at the outboard section of the tower is substantially higher than the inboard section as described above. In addition, this configuration using multiple short outboard sloping film fill sections above a film fill section extending substantially across the cooling region of the tower has unique performance advantages where the water loading is uniform across the distribution pan.

FIG. 4 illustrates another embodiment of the invention employing uneven water loading. This embodiment is similar in configuration to that of FIG. 2 in my co-pending patent application Ser. No. 410,364 with the exception that the water loading in the outboard section is higher than that of the inboard section. In this instance, the outboard section extends the distance of dimension C whereas the inboard section extends to the distance of dimension D. Here, the outboard film fill section generally designated by the number 64 is formed of three components, sloping high density film fill section 66 and upper and lower film fill sections 68 and 70 respectively. The description of the integral fill assembly 64 from my co-pending application is incorporated herein by reference. Briefly summarized, section 66 is disposed with a principal plane inclined at 45° although the angle is suitably between about 20° and 70° to the vertical. All components of this film fill section are formed of vertically disposed sh.eets parallel to the direction of gas flow as described above. Assembly 64 is mounted in the upper outboard area of the cooling tower adjacent to the upper portion of air inlet opening 72 framed by the tower side wall. Inboard of assembly 64 in the upper portion of the tower is a horizontal film section 74 which includes film fill such as a corrugated film type. Film fill section 74 suitably extends so that its bottom face is generally at the same elevation as the bottom face of film fill assembly 64.

A cooled liquid basin 76 is disposed below the film fill assembly 64 and film fill section 74 to receive gravitating liquid. Liquid is supplied to the top of assembly 64 and fill section 74 from water inlet pipe 78 which directs the water through spray nozzles 80 and 82 which provides distribution of the liquid over assembly 64 and fill section 74, respectively. A vertical stack 84 is secured at the top of the tower and extends upwardly to define an air outlet opening 86. A fan 88 is positioned in the stack and is coupled to a suitable source of power.

Below film fill assembly 64 is splash fill 90 which may be formed of a conventional type including a plurality of elongated splash bars suspended by conventional hangers, not shown.

An important feature of the embodiment of FIG. 4 is that the liquid supplied by nozzles 80 be at a greater rate per distribution area than that supplied by nozzles 82.

One way to accomplish this is to mount nozzles 80 with a higher flow capacity than nozzles 82. Another way is to use more nozzles 80 than 82. It is noted that although the outboard distribution of 2the water is illustrated through nozzles, distribution pans may be also be employed. However, since the fill section 74 is of the counterflow type, nozzles 82 must be used so as not to impede the flow of air out the stack.

It is most advantageous to use a high density sloping fill section 66 in combination with high density film fill sections 74. In an alternative embodiment not shown, the triangular fill sections 68 and 70 may also be of the splash fill type so long as high density fill section 66 is employed.

Other alternative configurations may be used in accordance with the present invention. For example, other suitable film fill may be used as the outboard film fill section in the tower below the outboard liquid supply section of liquid cooling. Also, different numbers and thicknesses of stacked sloping film fill may be used compared to the ones depicted in FIGS. 2 and 3. In some cases, it may be desirable to install a thin low density fill layer, or even leave a void, in the area adjacent to the air inlet face. This area could typically be 1-2 meters deep, or even a little more in special cases.

The foregoing description illustrates a single film fill section at the inboard fill section. However, it should be understood that the inboard fill section may include more than one film fill or splash fill sections so long as the outboard film fill section has a higher effective density than the inboard fill section.

What is claimed is:

1. A tower for contacting liquid and gas comprising at least one upright sidewall having a gas inlet opening, a gas outlet opening, means for supplying gravitating liquid through an upper portion of the tower and including adjacent outboard and inboard liquid supply sections, said outboard liquid supply section including means supplying gravitating liquid at a flow rate per distribution area substantially higher than said inboard liquid supply section, at least one outboard film fill section disposed directly below said outboard liquid supply section, and an inboard fill section including film fill or splash fill or both and disposed directly below said inboard liquid supply section, the effective fill density of said fill below said outboard liquid supply section being substantially higher than that of the fill below said inboard liquid supply section.

2. The tower of claim 1 in which said inboard fill section comprises splash fill.

3. The tower of claim 1 in which said one outboard film fill section comprises at least one sloping film fill section having a principal plane inclined at an angle of about 20° to 70° to the vertical.

4. The tower of claim 1 in which said one film fill section comprises a plurality of sheets mounted so that adjacent sheets define a gas path extending generally from proximal said gas inlet opening toward said gas outlet opening, said sheets being substantially vertically disposed.

5. The toward of claim 4 in which said sheets of said one film fill section are corrugated with the corrugations in adjacent sheets crossing the corrugations in the sheets between the alternate sheets.

6. The tower of claim 4 in which the average distance between adjacent sheets is no greater than about 25 mm.

7. A tower for contacting liquid and gas comprising at least one upright sidewall having a gas inlet opening, a gas outlet opening, means for supplying gravitating liquid through an upper portion of the tower and including adjacent outboard and inboard liquid supply sections, said outboard liquid supply section including means supplying gravitating liquid at a flow rate per distribution area substantially higher than said inboard liquid supply section, at least one outboard film fill section disposed directly below said outboard liquid supply section comprising a plurality of sheets mounted so that adjacent sheets define a gas path extending generally from proximal said gas inlet opening toward said gas outlet opening, said sheets being substantially vertically disposed, and an inboard fill section including film fill disposed directly below said inboard liquid supply section, said inboard fill section comprising a plurality of sheets mounted so that adjacent sheets define a gas path extending generally from said outboard film fill section toward said gas outlet opening, said sheets being substantially vertically disposed, the sheets of said one outboard film fill section being substantially more densely packed than the sheets of said inboard fill section.

8. A tower for contacting liquid and gas comprising at least one upright sidewall having a gas inlet opening, a gas outlet opening, means for supplying gravitating liquid through an upper portion of the tower and including adjacent outboard and inboard liquid supply sections, said outboard liquid supply section including means supplying gravitating liquid at a flow rate per distribution area substantially higher than said inboard liquid supply section, at least one outboard film fill section disposed directly below said outboard liquid supply section, and an inboard fill section including film fill or splash fill or both and disposed directly below said inboard liquid supply section, said one outboard film fill section comprising at least one sloping film fill section having a principal plane inclined at an angle of about 20° to 70° to the vertical, said one sloping film fill section extending no further inboard than a generally vertical plane proximal to the inboard boundary of said outboard film fill section.

9. The tower of claim 8 further comprising a second sloping film fill section having a principal plane inclined at an angle of about 20° to 70° to the vertical, said second sloping film fill section being disposed below said one sloping film fill section.

10. The tower of claim 9 in which said second sloping film fill section extends no further inboard than a generally vertical plane proximal to the inboard boundary of said outboard film fill section.

11. The tower of claim 9 in which said second sloping film fill section extends directly below said outboard and inboard liquid supply sections a distance at least 90% across both of sections in an inboard direction.

12. The tower of claim 11 further comprising a third film fill section having a principal plane inclined at an angle of about 20° to 70° to the vertical disposed between said first and second sloping film fill sections and spaced apart therefrom, said third film fill section extending no further inboard than said proximal plane.

13. A tower for contacting liquid and gas comprising at least one upright sidewall having a gas inlet opening, a gas outlet opening, means for supplying gravitating liquid through an upper portion of the tower, a liquid cooling region having outboard and inboard sides and disposed below said gravitating liquid supply means, a first sloping film fill section having a principal plane inclined at an angle of about 20° to 70° to the vertical and disposed in said liquid cooling region to extend proximal the outboard side thereof a distance inboard no further than about 50% of the length of the liquid cooling region, and a second sloping film fill section having a principal plane inclined at an angle of about 20° to 70° to the vertical, said second sloping film fill section being disposed below said first sloping film fill section and extending from proximal the outboard side thereof a distance inboard at least about 90% of the liquid cooling region.

14. The tower of claim 13 further comprising a third film fill section having a principal plane inclined at an angle of about 20° to 70° to the vertical disposed in sai cooling region between said first and second sloping film fill sections and spaced apart therefrom, said third film fill section extending a distance from proximal the outboard side thereof inboard no further than about 50% of the length of the liquid cooling region.

15. The tower of claim 13 in which said first and second sloping film fill sections each comprises a plurality of sheets mounted so that adjacent sheets define a gas path extending generally from said gas inlet opening toward said gas outlet opening, said sheets being substantially vertically disposed.

16. The tower of claim 15 in which the distance between adjacent sheets is no greater than about 25 mm.

17. The tower of claim 15 in which said sheets of said first sloping film fill section are corrugated with the corrugations in adjacent sheets crossing the corrugations in the sheets between the alternate sheets.

* * * * *